Patented Nov. 4, 1930

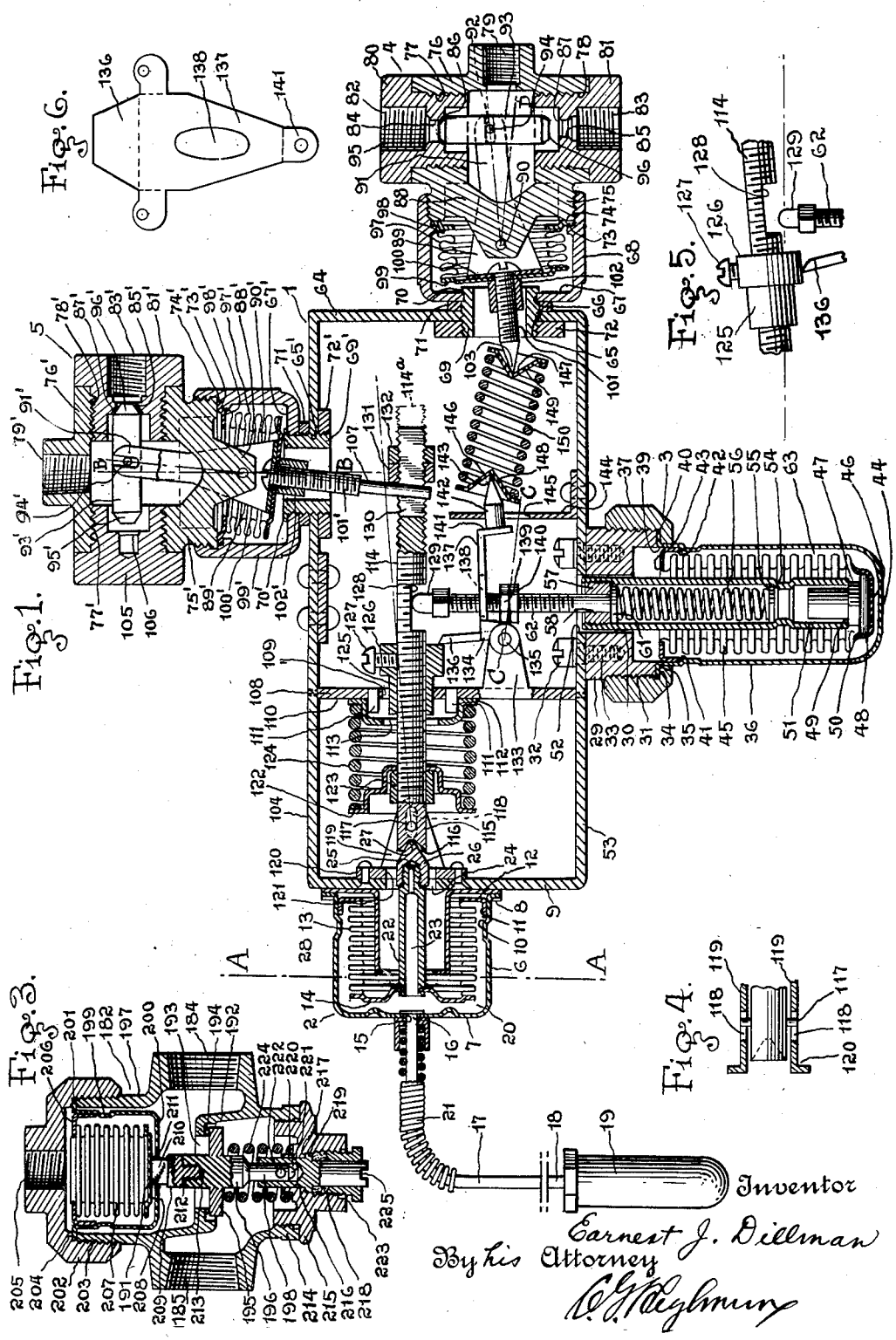

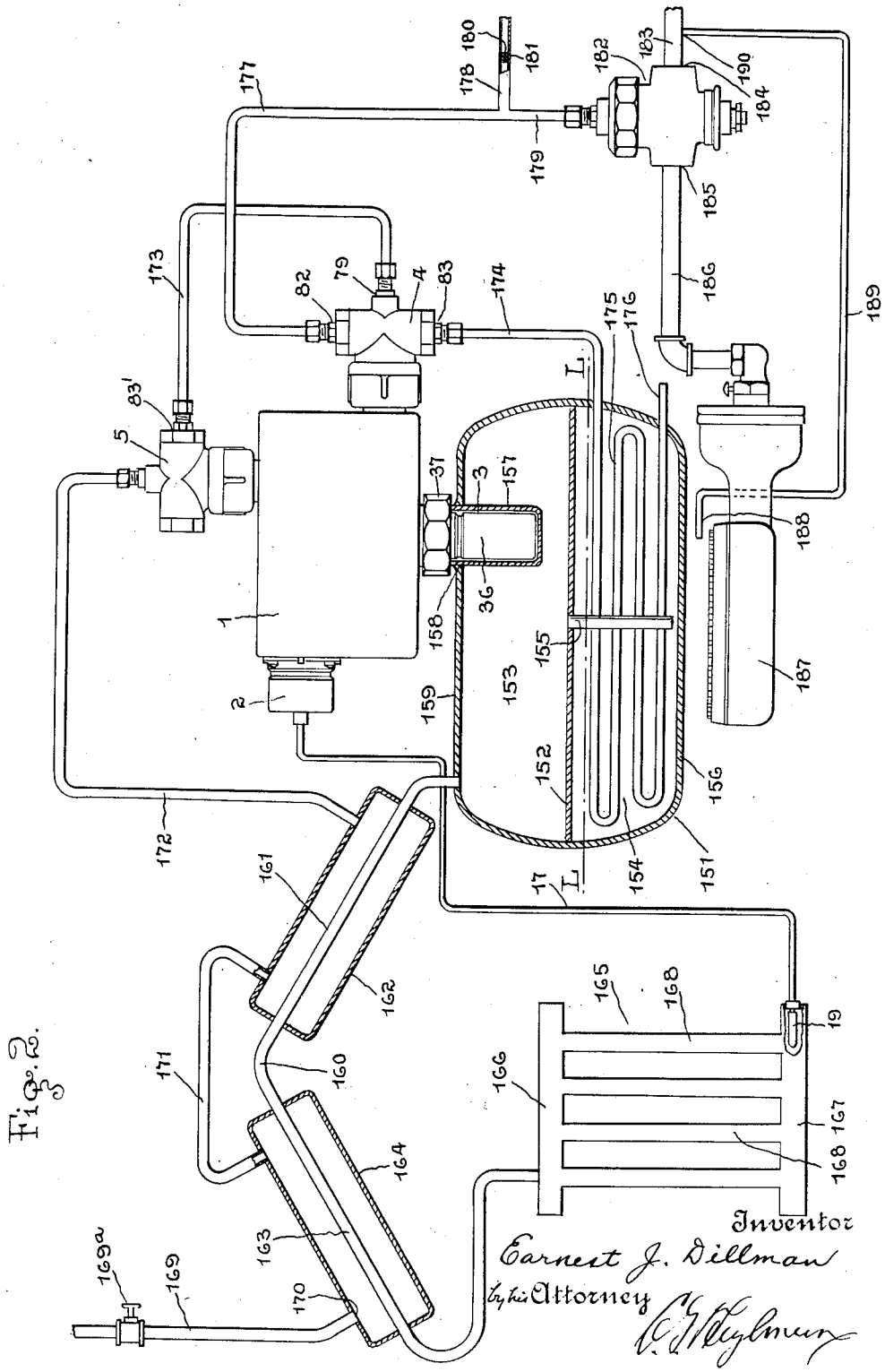

1,780,417

UNITED STATES PATENT OFFICE

EARNEST J. DILLMAN, OF DETROIT, MICHIGAN, ASSIGNOR TO AMERICAN RADIATOR COMPANY, OF NEW YORK, N. Y., A CORPORATION OF NEW JERSEY

CONTROL DEVICE

Application filed December 1, 1927. Serial No. 236,969.

My invention relates broadly and generally to new and useful improvements in control devices, and particularly contemplates the provision of an efficient device or apparatus which embodies a plurality of means for automatically actuating or controlling a control device in response to given conditions, or to changes of conditions whereby said control device will control or regulate a desired apparatus or mechanism in connection with which it is employed. While the invention is capable of embodiment or application in a multiplicity of various apparatus, I have shown it, for the purposes of this specification, as adapted for actuating certain flow control means which control a refrigeration apparatus, for example of the absorption type, having a cycle of operation wherein a refrigerant, such as ammonia, is expelled from a solution, preferably aqua-ammonia, contained in a so-called generator-absorber, is then rectified and condensed and passed to a so-called evaporator cooler to produce refrigeration, and whence the vapor of the refrigerant is returned to the generator-absorber to be reabsorbed by the liquid therein for repetition of the cycle.

The invention consists in the improved construction and combination of parts, to be more fully described hereinafter, and the novelty of which will be particularly pointed out and distinctly claimed.

In the accompanying drawings, to be taken as a part of this specification, I have fully and clearly illustrated a preferred embodiment of my invention, and in which drawings—

Figure 1 is a view in vertical longitudinal central section through the casing and associated parts of my improved control device;

Fig. 2 is a view showing the control device as embodied in a refrigeration apparatus;

Fig. 3 is a view in vertical central section of a flow control means adapted to control the flow of fuel gas to a burner;

Fig. 4 is a detail view;

Fig. 5 is a detail showing the relative positions assumed by certain of the elements of the invention at one period of its operation, and Fig. 6 is a detail view.

Referring to the drawings by characters of reference, 1 designates a hollow supporting casing which carries a device 2 and a second device 3, each of which is responsive to a condition which is a controlling factor in the operation of the apparatus in which the control device is embodied, a flow control means 4 dependent for its operation upon the devices 2 and 3, and a second flow control means 5 dependent for its operation upon the device 2.

The device 2 is preferably a thermostat of the fluid-pressure type, comprising a cup or hollow container 6 having a base or bottom 7, and which is secured at its rim 8, which is flanged outward, by any suitable means, such as screws, rivets, or the like, to the end wall 9 of the casing 1. The cup or container 6 has an annular internal shoulder 10 adjacent its rim and which supports a ring or annular member 11 which is sealed to the inner wall of the container 6 between said shoulder and said rim. On the member 11 is a laterally inwardly projecting flange 12, to which is secured and sealed, as by solder, or the like, one end of a longitudinally expansible-collapsible element 13, preferably in the form of a cylindrical circumferentially corrugated metallic bellows. The element 13 is concentric with the cup 6 and extends into the same with its free end, which is closed and sealed by a head 14, terminating adjacent to, but spaced from, the cup bottom 7 to permit longitudinal expansion of said element. Through the container base or bottom 7 is a central aperture 15 through and in which is sealed one end 16 of a tube or conduit 17. To the other or free end 18 of the tube 17, is sealed and secured a hollow bulb 19 communicating through the tube 17 with the space 20 surrounding the element 13 and within the container 6. A tube supporting means 21, preferably in the form of a coil spring, may be employed if desired. Sealed in a central opening in the head 14 is one end of a post or plunger 22 which extends axially through and beyond the element 13, and through an opening 24 in the end wall 9, and which also has a longitudinal open-ended bore 23. The device 2 is charged, after assembly, through the bore 23 with a suitable volatile fluid, such as methyl chloride, and the bore 23 of the plunger 22 is then sealed, as by solder, or the like, at the free end thereof, as at 25. Threaded or otherwise secured on the end of the plunger 22 is a cap 26 which covers and protects the solder seal 25, and which preferably has a conical operating tip 27. A stop member 28 is preferably provided which is rigid and fixed, for example, to the end wall 9, and which extends into the bellows or element 13 to limit inward movement or contraction of the element 13 by engagement of the head 14 therewith.

The device 3 is also preferably a thermostat of the fluid-pressure type, comprising a supporting member 29, preferably annular, having a central axial aperture 30 and external threads 31, and which is secured to the lower wall 53 of the casing 1 by screws 32, or the like, which are passed through the casing 1 and threaded into the member 29, as at 33. Abutting the annular underface 34 of the member 29, is a flange 35 extending laterally outward from the rim of a cup or container 36, and which is secured to the member 29 by a nut 37 threadedly engaging threads 31 and having a central aperture 39 whereby the nut may be passed over the container 36, and also having an internal shoulder 40 for cooperation with the supporting member 29 to clamp the flange 35 therebetween. Adjacent the flange 35, the container 36 has an internal circumferential shoulder 41, on which is supported a ring member 42 which is sealed, as by solder, or the like, to the inner wall of the container 36. Depending from and hermetically sealed, as at 43, to the inner periphery of the member 42, and extending downward to a point adjacent to but spaced from the end or bottom 44 of the container 36, is a longitudinally expansible-collapsible element 45, preferably in the form of a circumferentially corrugated cylindrical metallic bellows having a head 46 closing its free lower end. Mounted on the head 46 within the bellows 45 is a post 47 having a flanged end 48 above which the post is provided with an upwardly facing shoulder 49. The post is secured to the bellows 45 to move therewith, as for example, by the spinning of the metal of the bellows head 46 over the flange 48, as at 50. Seated on the shoulder 49 and surrounding the post 47, is a tube or hollow rod 51, which extends concentrically upward through the bellows 45 and member 29, and an aperture 52 in the lower casing wall 53. Within the hollow rod 51 is an upwardly facing shoulder 54 on which rests a spring support member 55 for a resilient element 56, preferably a helical coil spring. Secured in the free upper end of the hollow rod 51, as by threaded engagement, is a plug 57 having a guide aperture 58 axially therethrough. Held normally in engagement by the element 56 with the underface of the plug 57, is a spring follower member 61 which is rigid with a threaded rod 62 extending upwardly through the plug guide aperture 58. The space 63 surrounding the element 45 and within the container or cup 36 is filled with a suitable liquid, such as kerosene, which will expand and contract in response to changes of temperature in the media surrounding the container 36.

The end wall 64 of casing 1, which lies opposite the end wall 9, has an opening 65 therethrough, preferably below the horizontal plane of the device 2. Through this opening 65 and also through an opening 66 in base or end wall 67 of a hollow cylindrical member 68, is passed a hollow nipple 69 having a surrounding end flange 70 which is expanded to abut the inner face of the bottom wall 67 to clamp the latter against a shoulder on said nipple. A spacing washer 71 is arranged between member 68 and wall 64. Threaded on the end of the nipple which projects into the casing 1, is a nut 72 which fixes the nipple in the opening 65. Within the member 68 is a flange or shoulder 73 on which is seated a ring 74. Threaded into the member 68 is an externally threaded hollow boss 75 which engages the ring 74, compressing it and tightly sealing it against the shoulder 73. The boss 75 is carried by and supports a three-way hollow union 76 having internally threaded intercommunicating openings, designated 77, 78, 79. Threaded into the oppositely disposed openings, 77, 78, are valve seat members 80 and 81, respectively, through which are, respectively, flow passages 82, 83. Within each passage 82, 83 is an annular flange or constriction, respectively designated 84, 85, and forming valve seats 86, 87, respectively. Extending across or bridging the hollow boss 75 is a fulcrum bar 88 which is straddled by a yoke 89 which is pivoted on a pin 90 extending through and projecting from either side of the bar 88. The arms 91 of the yoke 89, of which but one arm is shown, extend into the hollow union 76 and have their ends slotted or notched, as at 92. Within the hollow union is a valve stem 93 through which projects transversely a pin 94, the projecting ends of which are respectively supported in the notches 92. The valve stem 93 is provided at each end with a valve, preferably conical, and designated, respectively, 95, 96, for cooperation with valve seats 86, 87, respectively. Carried by the ring 74 is an expansible-collapsible element 97, preferably a cylindrical, circumferentially corrugated, metallic bellows, which is sealed, as by solder, or the like, to the ring 74, at one end, as at 98, and which extends into the member 68 around the yoke 89. The other or free end of the bellows 97 is closed and sealed by a head 99 which overlies the base 100 of the yoke 89. Through centrally disposed apertures in the base 100 and head 99 is passed a screw 101 on which is threaded a nut 102 to tightly clamp the base and head together and to seal the apertures therethrough. The screw 101 extends into the casing 1 and has a conical end 103. The bellows 97 serves as a seal for the union 76 to prevent leakage therefrom.

The flow control means 5 which is fixed to the top wall 104 of the casing 1, is similar, except as indicated below, to the flow control means 4 described in the preceding paragraph, and therefore the reference characters applied to means 5 are the primes of the characters applied to means 4, corresponding primed characters referring to corresponding parts. In the means 5, the port 77' is closed by a plug 105 having an internal axial recess 106 to receive and stop the valve 95', and the free end of the screw 101' which projects into the casing 1 is of reduced diameter and cylindrical, as at 107, as distinguished from the conical end 103 of screw 101.

Within the casing 1 between the devices 2 and 3 is a vertical support member 108 fixed at its top and bottom ends to the top and bottom walls 104, 53, respectively. Through the member 108 is an aperture 109 and from the face or side 110 of member 108, toward the device 2, project positioning and supporting lugs 111 which are eccentric of the center of aperture 109. Supported on the lugs 111 is a spring follower member 112, having a central aperture 113. Extending freely through the apertures 109, 113, is a push rod or plunger 114, one end 115 of which is provided with a conical socket 116 for pivotal or universal engagement with the conical end 27 of plunger cap 26. Through the plunger end 115 is fixed a horizontal transverse pin 117, the projecting ends of which are supported in oppositely disposed longitudinal slots 118 in the substantially parallel arms 119 of a bracket 120, which is fixed by rivets, or the like, to the inside of end wall 9. It is therefore apparent that the plunger 114 may slide longitudinally, due to the slots 118, and may also be oscillated vertically on the pin 117 as a fulcrum. An opening 121 is made in the base of the bracket 120 for the free reciprocation therethrough of the plunger 22 and its cap 26. On the plunger 114 is a second spring follower member 122 having an adjusting nut 123 threaded on the plunger 114, and between the follower members 112 and 122 is a resilient expansion element 124, preferably a coil spring held under compression and urging the plunger 114 into engagement with the plunger cap 26. Threaded on the plunger rod 114 is an abutment sleeve 125 which projects through the aperture 109 in the support member 108, and normally bears on the bottom edge thereof which serves as a stop means to limit downward turning of plunger 114 on pin 117. On the sleeve 125 is a circumferential flange 126 which lies on the opposite side of the support member 108 from the device 2. A suitable locking means 127, such as a set screw, threaded radially through the flange 126 to bear on the plunger 114 is provided to fix the sleeve 125 in the position at which it is set on the plunger 114. Above the rod 62 of the device 3, the underside of the plunger 114 is recessed, as at 128, to provide a flat bearing surface, and threaded on the end of the rod 62 is an adjustable tip 129 which is adapted to contact the surface 128 to move the plunger 114 upwardly on its fulcrum pin 117. The free end of the plunger 114 which extends beneath and beyond the control means 5, is slotted, as at 130, to receive the cylindrical end 107 of the screw 101' which is held therein by an adjustment nut 131 and a lock nut 132, both threaded on the free end of plunger 114 beyond the screw 101'.

Extending from the support member 108 below the opening 109 and toward the flow control means 4, are substantially parallel horizontal supporting arms 133. Between the bracket arms 133 is positioned a bell crank lever 134, pivoted on a pin 135 supported in the arms 133. The lever 134 has an upwardly extending arm 136 and a substantially horizontal arm 137 having an elongated opening 138 therethrough, through which the plunger rod 62 extends. Threaded on the rod 62 is an adjustable abutment 139 and lock nut 140 which are positioned beneath the lever arm 137 and adapted to contact therewith adjacent the side edges of the opening 138 to move said bell crank lever 134 upwardly or counterclockwise on its fulcrum pin 135. The arm 136 terminates at its upper end above a horizontal plane through the lower edge of the flange 126 when the plunger 114 is in its down position, as shown in Fig. 1. The free end of the arm 137 has a depending lug 141 to which is rigidly secured an extension member 142, preferably a pin having a conical end 143. The bell crank lever 134 is shown in Fig. 6 as a flat blank which when bent on the dotted lines, as will be apparent, takes the form of the completed lever 134 of Fig. 1. Secured to the casing bottom wall 53 is an upwardly extending bracket 144, having an opening 145 therethrough, through which the pin 142 projects. The top and bottom edges of this opening serve respectively as upward and downward stops to limit the swing of the lever 134 on its fulcrum pin 135. The conical ends 143, 103 of the respective members 142 and 101 seat respectively in conical recesses 146, 147 of spring follower members 148, 149. Between these members 148, 149 is a spring 150, preferably of the helical coil type, which is held under compression therebetween.

The operation of the control device will be described, for the purposes of illustration, as controlling the cycle of operations of a refrigeration system of the absorption type; but I desire it to be understood that the control device may be employed or embodied in other apparatus where an automatic control is desirable. The elements comprising such an illustrative system having my improved control device embodied therein will, however, first be described.

In Figure 2, 151 designates a hollow container comprising a generator-absorber, preferably having a diaphragm or horizontal partition 152 therein which divides the casing internally into an upper compartment 153 and a lower compartment 154. Depending from and opening through the partition 152 is a hollow tube 155 which terminates at its free open end adjacent to but spaced from the bottom wall 156 of the casing 151. Within the upper compartment 153 is a cup-like container 157, preferably cylindrical, which is supported and sealed adjacent its rim, as at 158, in the top wall 159 of the casing. Telescoping this container 157 is the container 36 of the device 3, having the nut 37 supported or resting upon the rim of the container 157. Opening through the top wall 159 of the casing is a tube or conduit 160, which is inclined upwardly, as at 161, and surrounding this portion of the conduit is a hollow casing 162 comprising a rectifier. Beyond the rectifier the conduit is turned or inclined downward, as at 163, and surrounding this portion 163 is a hollow casing 164 comprising a condenser. From the condenser the unrestricted conduit 160 leads into an evaporator 165, which I have shown as a container comprising parallel spaced headers 166, 167, which are connected by flow pipes or conduits 168, which may be either for series or parallel flow. The generator-absorber, rectifier, condenser, and evaporator are illustrative only, and I desire it to be understood that other suitable devices or elements may be substituted therefor.

A cooling water supply conduit 169 having a hand control valve 169ᵃ leads from a source of supply, not shown, to the condenser 164, preferably adjacent its lower end, as at 170, and from the other end of the condenser a conduit 171 opens into the upper end of the rectifier 162. An outlet conduit 172, from the other or lower end of the rectifier, communicates with the valve part 79' of the flow control means 5. From the outlet port 83' of the means 5, a conduit 173 leads to the inlet port 79 of the flow control means 4, and from the interior of the union 76 water may be passed either through the outlet port 82 or the outlet port 83. A conduit 174 leads from the port 83 to a suitable cooling coil 175 positioned in the lower compartment 154 of the generator-absorber casing 151, and from this coil a conduit 176 leads to a waste pipe, not shown. Opening from the other port 82 is a conduit 177 which divides into conduit branches 178, 179, the branch 178 leading to a waste pipe (not shown), and having a constricted orifice 180 therein, preferably in the form of an apertured plug 181, the branch 179 leading to a fuel gas control valve 182. From a source of supply, not shown, fuel gas is admitted by a conduit 183 to the inlet port 184 of the valve 182, and from the outlet port 185 a conduit 186 feeds fuel gas, passing the valve 182, to a gas burner 187 which is positioned beneath the generator-absorber 151 so as to efficiently heat the same. A pilot burner 188 adapted to ignite gas issuing from burner 187 when valve 182 is opened, is positioned adjacent the main burner 187 and is constantly fed with fuel gas by a conduit 189 which opens into the conduit 183, as at 190.

The gas valve 182 comprises a hollow casing 191 into which the ports 184, 185 open, and between the ports is an internal web or partition 192 having a substantially horizontal portion with an opening 193 therethrough. Surrounding the underside of the opening 193 is a bead 194 serving as a valve seat for cooperation with a valve 195, preferably a flat disk. Extending through the disk and projecting from each face thereof, is a valve stem 196, one end of which extends upwardly through the valve opening 193 and into the lower end of a cylindrical open-ended hollow boss 197 on the casing 191 and concentric with opening 193, and the other end of which extends downward and is of reduced diameter, as at 198. Within the boss 197 and concentric therewith is a cylindrical support member 199 having a base or bottom 200 and a circumferential flange 201 which seats on the end of boss 197 to support the member. A cap 202 overlies the boss 197 and is preferably threaded thereon, as at 203, and has an internal shoulder 204 cooperable with the end of the boss 197 to tightly clamp the flange 201 therebetween. Through the cap 202 is a port 205 in which the branch conduit 179 is secured. Carried rigidly by and sealed to the support member 199 adjacent flange 201, is an internal ring 206, from which depends a longitudinally expansible-collapsible element 207, preferably in the form of a cylindrical circumferentially corrugated metallic bellows, and which is sealed thereto. The free end of the bellows 207 terminates adjacent to but spaced from the support base or bottom 200 to permit expansion of said bellows. A head 208 closes the bottom open end of the bellows, and depending rigidly therefrom is plunger 209 having a portion of its length square or rectangular in cross-section, as at 210, which passes through a similarly formed guide opening 211 in the support bottom 200. The plunger 209 is of reduced cross section, and threaded, as at 212, for adjustable screw connection with an internally threaded socket 213 in the top or upper end of the stem 196. Depending from the casing 191 is a cylindrical internally threaded flange 214, in which is threaded a plug 215 having a central aperture 216 with an internal downward facing shoulder 217. Extending through the aperture 216 is a cylindrical adjustment member 218 having a circumferential flange 219 adapted to seat against the shoulder 217. In the top or inner end of the member 218 is an axial recess 220 serving as a guide sleeve, and into which the reduced end of the valve stem 196 extends. At diametrically opposite points in the sleeve 220 are longitudinal slots 221, into each of which extends a pin 222 projecting laterally from the reduced portion of the stem 196. A packing gland 223 is provided in the plug 215 to prevent leakage through aperture 216 around the member 218. Surrounding the sleeve 220 is a coil spring 224 which is held under compression between the plug 215 and the disk 195 to normally urge the valve disk 195 to its seat 194. By rotation of the member 218 by means of the screw driver notch 225, the plunger 209 and stem 196 may be screwed toward or away from each other to increase or decrease the tension set up in the bellows 207 to thereby control the pressure at which the valve may open.

The bulb 19 of the device 2 is preferably inserted in header 167 of the evaporator 165, but I wish it to be understood that the bulb 19 may be placed outside of and adjacent the evaporator, or be otherwise positioned so that it will respond to the evaporator temperature. Such is also the case with the bulb 36 of the device 3, that is, although it is preferably placed in the compartment 153, it may be placed in the flue, not shown, which leads from the burner 187, or it may be placed adjacent the generator-absorber 151 where it will respond to the temperature thereof.

In the operation of my control device as embodied in such an absorption refrigeration system, as is above described, Figure 1 shows the relative positions of the parts after the temperature of the solution in the generator-absorber 151 has been raised during the generation period by the heater 187 to a point high enough to cause the thermostat device 3 to act to snap the snap action, comprising the lever 134, spring 150 and yoke 89 upward to quickly move the valve stem 93 to seat the valve 95 which cuts off the water pressure on gas valve 182 permitting it to close under the action of spring 224. With the flame of burner 187 out, the temperature in the generator drops, causing the plunger 62 to recede to the position shown, and since the temperature in the evaporator is low, the spring 124 has extended the bellows 13 and moved the plunger 114 to the left of Fig. 1; but when the temperature in the evaporator has reached its lowest point, the flange abutment 126 will be out of contact with the lever arm 136.

When the system is at rest and at room temperature with the water supply control valve 169ᵃ closed so that no cooling water is admitted to the system, the elements of my control device will have the following positions:—In the thermosensitive device 2 the bellows 13 under the action of the expanded volatile will be collapsed with the bellows head 14, substantially at the line A—A, and the free end of the plunger 114 will be in the dotted position, designated 114ᵃ. In this position the abutment 131 will have permitted the screw 101' and yoke 89' to rotate counter-clockwise on the pin 90' to substantially the line B—B under the action of the inherent tension of the bellows 97' in moving to its normal vertical position which will open wide the throttle valve 96'. The lever arm 137 will be down with the center line of pin 142, substantially in line C—C, and with screw 101 and yoke 89 substantially in the position of the line indicated at D, in which position of the snap movement the valve 96 will be on its seat to cut off flow to the cooling coil 175.

When the system is started from the position of rest above described, the interrelated movements of the elements of my control device in the cycle of operation of the system is as follows: The manually operated water 169ᵃ in the cooling water supply line 169 is opened, the pilot burner 188 having been lit, water flows through the condenser 164, pipe 171, to rectifier 162, through the rectifier 162, pipe 172, the wide open port 83' of the throttling valve 5, to the flow control valve 4 by means of pipe 173, and passing through port 82 to pipe 177 exerts fluid pressure on the bellows head 208 to overcome spring 224 to open the valve 182 to permit flow of fuel gas to the burner 187, which is ignited by the pilot flame at 188. Flow of cooling water through the system is maintained by the waste outlet pipe 178 which is, however, provided with the constricted orifice 180 to maintain the proper head of water on the bellows head 208 to hold the valve 182 open. As the gas burner 187 heats the generator-absorber 151 which contains a refrigerant and an absorbent, preferably a solution of ammonia and water which will have a maximum high level substantially at the line L—L, and which when heated results in the evolution of ammonia vapor in the chamber 154. The pressure resulting in chamber 154 from the heating of the solution, drives the solution up through the tube 155 into the chamber 153 above the partition 152. As burner 187 continues to heat the generator-absorber, ammonia vapor is driven off in chamber 153 and flows therefrom through the pipe 160 into portion 161 within the rectifier 162, where any water carried or entrained by the vapor is separated out and flows back, due to the inclination of the pipe 161, to the chamber 153, while the liberated ammonia vapor passes into pipe portion 163 located in the condenser 164 where the vapor is condensed to liquid form and flows therefrom into the evaporator 165 constituting the cooling element. As the refrigerant solution is weakened by evaporation of the ammonia, the temperature of the weakened solution rises, and this rising temperature is used as a controlling factor for my automatic control device.

When the temperature of the solution in chamber 153 reaches a predetermined point desirable for efficient operation—say, 260° F., for example—the thermosensitive device 3 will act, due to the increased pressure of the heated volatile surrounding bellows 45, to move the plunger 62 upward. The tip 129 and abutment 140 are adjusted so that as the plunger 62 moves upward, the tip 129 will engage the plunger rod 114 and swing it upwardly on its fulcrum 117 until the lower edge of the flange 126 is above the free upper end of lever arm 136, because the parts 126, 136 have relatively substantially the same position as is shown in Fig. 1 when the snap movement and lever 137 are down and in the opposite position from that shown, and lever 137 could only be moved up by first overcoming the thermosensitive device 2, as arm 136 would otherwise abut flange 126. When flange 126 clears the upper end of lever 136, abutment 140 will engage lever arm 137, moving it upward until the pin end 143 passes through the line of centers of the pin 135 and the screw end 103 in the position of line D. The arm 137 will then snap upward and be stopped by the upper edge of the stop opening 145 which will result in the compression spring 150 exerting its force on screw end 103 to rotate the yoke 89 counterclockwise with a snap action about fulcrum pin 90 to positively and quickly seat valve 95 and simultaneously opening valve 96, the position of the parts 137, 150, 89 and 93 being as shown in Fig. 1. This movement of the double valve stem 93 cuts off passage 82 and opens passage 83, which diverts the flow of water from the pipe 177 to the pipe 174, and the water than flows from pipe 173 through control means 4 and the pipe 174 to the cooling element or coil 175 in the generator-absorber chamber 154, and thence to the waste outlet pipe 176. The cutting off of the passage 82 stops the flow of water through pipe 177 and relieves the fluid pressure on the bellows head 208, which permits the spring 224 to seat the valve disk 195 on its seat 194 to cut off the fuel gas flow and extinguish the main burner 187. The cooling water which now is flowing through coil 175 causes a drop of pressure in the generator-absorber chamber 154, which due to a difference of pressures draws the solution in upper chamber 153 back through pipe 155 into chamber 154, and also causes the liquid ammonia in the evaporator cooler 165 to vaporize and flow back through pipe 160, chamber 153 and tube 155 to chamber 154, where it bubbles up through the weakened solution therein to be absorbed thereby. The heat evolved in chamber 154 by the absorption of the ammonia in the solution, is carried off by the relatively cool water which is flowing through the cooling coil 175.

As the temperature of the generator-absorber drops, the thermosensitive device 3 will cool and the plunger 62 will recede, the spring 56 serving only as a safety cushion to prevent rupture of the bellows 45 and injury to the moving parts of the control device, if the liquid pressure in container 36 goes too high. If the temperature of the evaporator-cooler 165 is still high, so that the plunger 114 is in the dotted position 114ª, the flange 126 will rest upon the upper free end of lever arm 136, as is shown in Fig. 5; but if the evaporator has cooled down somewhat the plunger 114 will have been moved partially to the left of Fig. 1 by the spring 124 and the flange 126 will drop behind the arm 136, as is shown in Fig. 1. Should the parts of the control device, at this stage of the cycle, however, be relatively as shown in Fig. 5, then as the evaporator-cooler cools, due to evaporation from the body of liquid refrigerant therein, the volatile in the device 2 will contract to permit the spring 124 to first slide the flange 126 to the left of Fig. 5 on the end of lever arm 136, until the flange passes off arm 136 and flange 126 drops down with plunger 114 bearing on the bottom edge of opening 109, as in Fig. 1. The evaporator-cooler temperature is not yet at its low point, for example, 15° F., and therefore the volatile in the device 2 will further contract, permitting spring 124 to move plunger 114 further to the left of its position, Fig. 1, thus moving flange 126 and arm 136 out of contact.

As the plunger 114 moves to the left of Fig. 1, the adjustable abutment 131 will engage the screw 101′, and acting through yoke 89′ will move valve 96′ toward its seat 87′, which will automatically cut down the flow of water through the cooling coil 175. When the temperature surrounding the bulb 19 of device 2 has reached its desired low temperature limit, the control means 5 will have a mean control position, such that just enough water will flow therethrough to the cooling coil 175 to carry off enough heat of absorption from the solution to control the evaporation of ammonia in the evaporator 165 so as to maintain the desired low temperature surrounding the thermostatic bulb 19. In other words, by the means just described, in the control device 2 and the throttling valve 5, the rate of evaporation from the body of liquid refrigerant in the evaporator-cooler 165 is regulated by controlling the rate at which the refrigerant vapor is absorbed in the absorber. Since the control valve 96' is controlled by the evaporator temperature, and it in turn controls the evaporator temperature through its variable control of the absorber temperature, it is evident that the temperature of the evaporator is maintained substantially constant, any variation from the predetermined low temperature limit being only such as is possible in the very short time interval necessary for the device 2 to respond fully to minute changes of temperature surrounding the bulb 19, once the low limit is reached.

After the supply of liquid ammonia in the evaporator-cooler 165 has been exhausted by evaporation, the temperature of the evaporator-cooler will rise, and when the temperature reaches a predetermined high point, say 32° F., the volatile in bulb 19 of device 2, due to its resulting rise of pressure, will act on the bellows head 14, and when the pressure becomes high enough to collapse bellows 13 and compress spring 124, the plunger 114 will be moved to the right of Fig. 1. As the plunger 114 moves to the right, flange 126 will come into abutting relation to the upper end of arm 136, and upon further movement of plunger 114, flange 126 will rotate the bell-crank lever 134 clockwise on the pin 135 till pin 142 passes through the line of centers of bearing pin 135 and screw end 103, when the lever 137 will snap down with pin 142, bringing up against the lower edge of stop opening 145, resulting in the snapping of yoke 89 in clockwise rotation on its pivot 90 to quickly move valve 96 to its seat, thereby cutting off the flow of water through passage 83. Movement of the plunger 114 further to the right to its dotted position 114ª, opens wide the throttle valve 5, and when port 83 was closed by the snap movement, port 82 was opened again permitting flow of cooling water to outlet 178, and water pressure on valve 182 to reopen the fuel gas supply pipe 183 to the main burner 187, thus completing the cycle of operation and starting said cycle anew.

It is to be noted that the burner control valve 187 acts as a safety means, whereby if cooling water is not available, spring 224 will cut off the gas supply to the burner 187 and overheating of the apparatus will be prevented.

I desire it understood that wherever I employ the term temperature responsive means in the appended claims, I include within the term devices responsive to a temperature condition, either as a direct temperature effect or as a pressure effect resulting from a temperature condition or change of temperature.

What I claim and desire to secure by Letters Patent of the United States is:—

1. A control apparatus of the character described, comprising a control device, temperature responsive means for moving said control device to one position, a second temperature responsive means for moving said control device to another position, and means whereby operation of one of said temperature responsive means when acting to move said control device moves the other temperature responsive means from its actuative relation to said control device.

2. A control apparatus of the character described, comprising a control device, a snap movement including a lever for actuating said control device, temperature responsive means for moving said lever to cause the snap movement to actuate said control device to one position, a second temperature responsive means for moving said lever to cause the snap movement to move said control device to another position, and means whereby the first-named temperature responsive means when operating to move the lever acts to prevent resistance of said second temperature responsive means to said snap movement.

3. A control apparatus of the character described, comprising a control device, a snap movement including a lever for actuating said control device, temperature responsive means for moving said lever to cause the snap movement to actuate said control device to one position, a second temperature responsive means for moving said lever to cause the snap movement to actuate said control device to another position, and means whereby operation of one of said temperature responsive means to move said lever acts to move the other temperature responsive means out of operative relation to said lever.

4. A control device of the character described, comprising a control device, a snap movement including a lever for actuating said control device, a plunger for moving said lever to cause said snap movement to actuate said control device to one position, temperature responsive means to actuate said plunger, a second plunger for moving said lever to cause said snap movement to actuate said control device to another position, temperature responsive means to actuate said second plunger, and means whereby movement of one of said plungers moves the other plunger out of position to move said lever.

5. A control device of the character described, comprising a control device, a snap movement including a lever for actuating said control device, a plunger for moving said lever to cause said snap movement to actuate said control device to one position, temperature responsive means to actuate said plunger, a second plunger for moving said lever to cause said snap movement to actuate said control device to another position, temperature responsive means to actuate said second plunger, means whereby movement of one of said plungers in one direction to actuate said lever, operates to move the other plunger out of position to move said lever, and movement of said one plunger in the other direction causes the said other plunger to resume its position wherein it is operative to move said lever.

6. A control apparatus of the character described, comprising a control device movable to a plurality of control positions, snap means for moving said device to said positions and including a lever, a plunger operable on said lever to cause the snap means to move the control device to one position, temperature responsive means to move said plunger, a second plunger operable on said lever to cause the snap means to move the control device to another position, temperature responsive means to actuate said second plunger, one of said plungers being adapted to engage the other plunger to move it out of position to move said lever previous to actuation of said lever by said one plunger.

7. A control apparatus of the character described, comprising a control device movable to a plurality of control positions, snap means for moving said device to said positions and including a lever, a plunger operable on said lever to cause the snap means to move the control device to one position, said plunger being movable out of engagement with said lever, temperature responsive means to move said plunger to actuate said snap means, a second plunger operable to move said lever to cause the snap means to move the control device to another position, temperature responsive means to actuate said second plunger, said second plunger being arranged to move the first plunger out of position to move said lever when said second plunger operates to actuate the lever.

8. A control device of the character described, comprising a control device, snap means for actuating said control device and including a lever, a reciprocable plunger having an adjustable abutment adapted to engage said lever to move the same to cause said snap means to actuate said control device to one position, said plunger being mounted for lateral movement to place said abutment in and out of position to move said lever, temperature responsive means to move said plunger to cause said abutment to operate said lever, resilient means opposing said temperature responsive means, a second plunger operable on said control device to move said device to another position, temperature responsive means to move said second plunger, said second plunger having provision to engage said first-named plunger to move the same to carry said abutment out of position in which it may engage said lever.

9. A control device of the character described, comprising a control device, snap means for actuating said control device and including a lever, a reciprocable plunger having an abutment adapted to engage said lever to move the same to cause said snap means to actuate said control device to one position, said plunger being mounted for lateral movement to place said abutment in and out of position to move said lever, temperature responsive means to move said plunger to cause said abutment to operate said lever, resilient means opposing said temperature responsive means, a second plunger operable on said control device to move said device to another position, temperature responsive means to move said second plunger, said second plunger having provision to engage said first-named plunger to move the same to carry said abutment out of position in which it may engage said lever, said first-named plunger acting automatically to resume position to place said abutment in position to engage said lever when said second plunger is retracted.

10. A controlling means of the character described, comprising a three-way valve having an inlet port, and outlet ports connected thereto, valve means adapted to alternately open and close said outlet ports, a valve controlling flow through one of said outlet ports, temperature responsive means to move said valve means to open one of said outlet ports and close the other of said outlet ports, a second temperature responsive means to move said valve means to close said one outlet port and open said other outlet port, and simultaneously open said second-named valve, and means whereby operation of said first-named temperature responsive means when moving said valve means acts to render said second-named temperature responsive means inoperative with respect to said valve means.

11. A controlling means of the character described, comprising a three-way valve having an inlet port, and outlet ports connected thereto, valve means adapted to alternately open and close said outlet ports, a valve controlling flow through one of said outlet ports, temperature responsive means to move said valve means to open one of said outlet ports and close the other of said outlet ports, a second temperature responsive means to move said valve means to close said one outlet port and open said other outlet port, means moved by said second temperature responsive means when acting to move said valve means to open said second-named valve.

12. A controlling means of the character described, comprising a three-way valve having an inlet port, and outlet ports connected thereto, valve means adapted to alternately open and close said outlet ports, a valve controlling flow through one of said outlet ports, temperature responsive means to move said valve means to open one of said outlet ports and close the other of said outlet ports, and means moved by said temperature responsive means to open said second-named valve.

13. A controlling means of the character described, comprising a three-way valve having an inlet port, and outlet ports connected thereto, valve means adapted to alternately open and close said outlet ports, a valve controlling flow through one of said outlet ports, temperature responsive means to move said valve means to open one of said outlet ports and close the other of said outlet ports, and means moved in one direction by said temperature responsive means to open said second-named valve, and in the other direction to move said second-named valve toward closed position.

14. A controlling means of the character described, comprising a three-way valve having an inlet port, and outlet ports connected thereto, valve means adapted to alternately open and close said outlet ports, a valve controlling flow through one of said outlet ports, temperature responsive means to move said valve means to open one of said outlet ports and close the other of said outlet ports, a second temperature responsive means to move said valve means to close said one outlet port and open said other outlet port, means moved by said second temperature responsive means when acting to move said valve means to open said second-named valve, and means whereby said first-named temperature responsive means when acting to operate said three-way valve places said second-named temperature responsive means out of actuating relation to said three-way valve.

15. A control apparatus of the character described, comprising a plurality of flow control means, one of said means having a plurality of intercommunicating flow control passages, means to control said passages and having a lever operatively connected thereto, a reciprocable plunger adapted in one direction of movement to engage said lever to move the same to operate said passage control means to one position and during said one direction movement to control another of said flow control means, temperature responsive means to move said plunger in said one direction, resilient means opposing movement of said temperature responsive means and acting to move said plunger in the opposite direction to control said other flow control means.

16. A control apparatus of the character described, comprising a flow control means, snap means for actuating said control means and including a lever, a reciprocable plunger having an abutment adapted to engage said lever to move the same to cause said snap movement to actuate said control means to one flow control position, said plunger being mounted for lateral movement to place said abutment in and out of position to move said lever, temperature responsive means to move said plunger to cause said abutment to operate said lever, a second plunger operable on said control means to move said means to another flow control position, temperature responsive means to move said second plunger, said second plunger having provision to engage said first-named plunger to move the same to carry said abutment out of engaging relation to said lever, and a second flow control means having operative connection with said first-named plunger, said first-named plunger acting automatically to resume position to place said abutment in position to engage said lever when said second plunger has been retracted, and simultaneously therewith to control said second flow control means.

17. A control apparatus of the character described, comprising a three-way valve having an inlet port, and outlet ports connected thereto, valve means adapted to alternately open and close said outlet ports, a valve having an inlet and an outlet and controlling said inlet port, valve means adapted to open and close the outlet of said second valve, snap means for actuating said first-named valve means and including a lever, a reciprocable plunger having an adjustable abutment adapted in one direction of movement to engage said lever to move the same to cause said snap means to actuate said first-named valve means to open one of said outlet ports and close the other of said outlet ports, said plunger having operative connection to said second valve means whereby during said one direction movement of said plunger said second valve means is moved by said plunger to open said outlet, temperature responsive means to move said plunger in said one direction, resilient means opposing movement of said plunger in said one direction whereby said resilient means may move said plunger in the opposite direction to move said second-named valve means to close said outlet independently of operative effect upon said first-named valve means.

18. A control apparatus of the character described, comprising a three-way valve having an inlet port, and outlet ports connected thereto, valve means adapted to alternately open and close said outlet ports, a valve having an inlet and an outlet and controlling said inlet port, valve means adapted to open and close the outlet of said second valve, snap means for actuating said first-named valve means and including a lever, a reciprocable plunger having an adjustable abutment adapted in one direction of movement to engage said lever to move the same to cause said snap means to actuate said first-named valve means to open one of said outlet ports and close the other of said outlet ports, said plunger having operative connection to said second valve means whereby during said one direction movement of said plunger said second valve means is moved by said plunger to open said outlet, temperature responsive means to move said plunger in said one direction, resilient means opposing movement of said plunger in said one direction, said plunger being mounted for lateral movement whereby said abutment may be placed in and out of position to move said lever, a second reciprocable plunger adapted in one direction of movement to engage said first-named plunger to move the same laterally to carry said abutment out of position in which it may engage said lever and during said one direction movement acting on said lever to move the same to cause said snap means to actuate said first-named valve means to close said one outlet port and open said other outlet port, said first-named plunger acting automatically under the action of said resilient means to resume position to place said abutment in position to engage said lever, when said second plunger is retracted, and simultaneously therewith to move said second-valve means to close said outlet.

19. A control apparatus of the character described, comprising a movable control device, temperature responsive means for actuating said control device, a pair of members normally having cooperable relation to transmit movement from said temperature responsive means to said control device to move said control device in one direction, and a second temperature responsive means having means to engage one of said members to move said control device in the opposite direction, said second temperature responsive means being operable to move one of said members out of cooperable relation to the other of said members when said second temperature responsive means acts to move said control device.

20. A control apparatus of the character described, comprising a movable control device, lever means for actuating said control device, temperature responsive means normally positioned in opposing relation to said lever means and being movable into engagement therewith for moving said lever means in one direction, a second temperature responsive means having means to engage said lever means to move said lever means in the opposite direction, and means to prevent opposition by said first temperature responsive means to movement of said lever means when said second temperature responsive means acts to move said lever means.

21. A control apparatus of the character described, comprising a movable control device, lever means for actuating said control device, temperature responsive means normally positioned in opposing relation to said lever means and being movable into engagement therewith for moving said lever means in one direction, a second temperature responsive means having means to engage said lever means to move said lever means in the opposite direction, and means actuated by said second temperature responsive means to prevent opposition by said first temperature responsive means to movement of said lever means when said second temperature responsive means acts to move said lever means.

22. A control apparatus of the character described, comprising a movable control device, lever means for actuating said control device, temperature responsive means normally positioned in opposing relation to said lever means and being movable into engagement therewith for moving said lever means in one direction, a second temperature responsive means having means to engage said lever means to move said lever means in the opposite direction, and means actuated by said second temperature responsive means to move said lever means and said first temperature responsive means out of opposing relation when said second temperature responsive means acts to move said lever means.

23. A control apparatus of the character described, comprising a movable control device, lever means for actuating said control device, temperature responsive means for moving said lever means in one direction, a movable abutment member operable to transmit motion from said temperature responsive means to said lever means, a second temperature responsive means having means to engage said lever means to move said lever means in the opposite direction, and means actuated by said second temperature responsive means to move said abutment member out of motion-transmitting position when said second temperature responsive means acts to move said lever means.

24. A control apparatus of the character described, comprising a movable control device, temperature responsive means, lever means having operative connection to said control device, one of said means having a pivotally supported abutment having a normal position for transmitting motion from said first-named means to said second-named means whereby said first-named means can move said control device, and a second temperature responsive means operable on said lever means to move said control device, said second temperature responsive means acting to swing said abutment out of motion-transmitting position.

25. A control apparatus of the character described, comprising a movable control device, temperature responsive means for actuating said control device, a pair of members positioned between said device and said means to transmit motion therebetween, one of said members being supported for movement substantially transverse to the path of movement of said members in actuating said device, and a second temperature responsive means having means to engage one of said members to actuate said control device, said second temperature responsive means acting to move said supported member transversely when said second temperature responsive means acts to move said device whereby to place said supported member out of the path of movement of the other of said members.

In testimony whereof I have hereunto signed my name.

EARNEST J. DILLMAN.